United States Patent
de Jong et al.

(10) Patent No.: US 7,148,273 B2
(45) Date of Patent: Dec. 12, 2006

(54) BITUMINOUS COMPOSITION WITH REDUCED GELATION TENDENCY

(75) Inventors: Wouter de Jong, Amsterdam (NL); Duco Bodt, Amsterdam (NL); Erik A. T. Trommelen, Amsterdam (NL)

(73) Assignee: Kraton Polymers US LLC, Houston, TX (US)

( * ) Notice: Subject to any disclaimer, the term of this patent is extended or adjusted under 35 U.S.C. 154(b) by 17 days.

(21) Appl. No.: 10/433,218

(22) PCT Filed: Nov. 29, 2001

(86) PCT No.: PCT/EP01/14162

§ 371 (c)(1),
(2), (4) Date: Oct. 3, 2003

(87) PCT Pub. No.: WO02/44281

PCT Pub. Date: Jun. 6, 2002

(65) Prior Publication Data

US 2004/0048979 A1    Mar. 11, 2004

(30) Foreign Application Priority Data

Dec. 1, 2000  (EP) ................... 00310673
Dec. 7, 2000  (EP) ................... 00310896

(51) Int. Cl.
*C08L 95/00* (2006.01)

(52) U.S. Cl. .......................... 524/59; 525/338; 525/98; 524/64

(58) Field of Classification Search .................. 525/98, 525/338; 524/59, 64
See application file for complete search history.

(56) References Cited

U.S. PATENT DOCUMENTS

| 3,663,635 A | 5/1972 | Lassau et al. | |
| 3,700,748 A | 10/1972 | Winkler | |
| 4,994,508 A * | 2/1991 | Shiraki et al. | 524/14 |
| 5,039,755 A | 8/1991 | Chamberlain et al. | |
| 5,051,457 A | 9/1991 | Gelles | |
| 5,830,925 A | 11/1998 | Chion et al. | |
| 5,925,717 A | 7/1999 | De Boer et al. | |
| 5,932,287 A * | 8/1999 | Michelsen et al. | 427/315 |

FOREIGN PATENT DOCUMENTS

| DE | 3401983 A1 | 8/1984 |
| EP | 0 423 875 A1 | 4/1991 |
| EP | 0 339 986 B1 | 12/1992 |
| EP | 0 545 844 A1 | 6/1993 |
| EP | 0 584 860 A1 | 3/1994 |
| EP | 0 434 469 B1 | 2/1995 |
| EP | 0 302 505 B1 | 4/1995 |
| EP | 0 795 564 A1 | 9/1997 |
| EP | 0 810 231 A1 | 12/1997 |
| EP | 0 544 304 B1 | 2/1998 |
| EP | 1 311 561 B1 | 6/2005 |
| GB | 1 538 266 | 1/1979 |
| GB | 2 255 979 A | 11/1992 |
| WO | 95/25130 | 9/1995 |
| WO | WO 98/07788 * | 2/1998 |

* cited by examiner

*Primary Examiner*—Jeffrey Mullis
(74) *Attorney, Agent, or Firm*—Donna Blalock Holguin

(57) ABSTRACT

The present invention concerns a bituminous composition which comprises a bituminous component (I), a block copolymer (II), comprising at least two terminal blocks of a poly(monovinylaromatic hydrocarbon) and at least one block of a poly(conjugated diene), and optionally a filler (III), wherein (II) is a partially hydrogenated block polymer, comprising butadiene as the conjugated diene, wherein the poly(conjugated diene) block upon partial hydrogenation comprises less than 3 mol % 1,2-dine recurring units (A) and less than 20 mol % preferably less than 3 mol % ethylene recurring units (D), calculated on the total content mol/mol of conjugated diene recurring units.

19 Claims, No Drawings

US 7,148,273 B2

BITUMINOUS COMPOSITION WITH REDUCED GELATION TENDENCY

SUMMARY OF THE INVENTION

The present invention concerns bituminous compositions having a reduced tendency to gelation during processing, in combination with excellent high and low temperature performance properties.

BACKGROUND TO THE INVENTION

A major proportion of the roofing felts, pipe coatings, roads, sound deadening panels, coating carpet tiles, joint sealing formulations and mopping adhesives applied nowadays are made of modified bituminous compositions, e.g., bituminous compositions comprising a bitumen component and an elastomer component, typically a styrenic block copolymer such as SBS (polystyrene-polybutadiene-polystyrene); SEBS (polystyrene-poly[ethylene-butylene]-polystyrene); SIS (polystyrene-polyisoprene-polystyrene) and SEPS (polystyrene-poly[ethylene-propylene]-polystyrene) and the like. Advantages of modified bituminous compositions over traditional systems (blown bitumen) include: improved fatigue resistance (the accommodation of repeated thermal movements of the roof); improved flexibility (especially at low temperature); improved strength (to allow a reduction in the number of plies of felt by replacing in whole or part the traditional blown bitumen coated system); improved resistance to permanent deformation, puncture and tear; and improved elasticity, resulting in a greater capacity to bridge movement of crack and joints.

Styrenic block copolymers of particular interest are SBS type polymers having a relatively high "vinyl" content, i.e., a content of butadiene moiety built into the polymer backbone by 1,2-addition of at least 10 mol % (based on the total butadiene content). These Improved Processing Durability polymers have excellent high temperature viscosities and excellent ageing characteristics in bituminous compositions.

Unfortunately, high vinyl polymers, i.e. IPD polymers (IPD is a trademark) have an increased tendency to cross-link (gelation tendency) when subjected to or stored at elevated temperatures, as compared to ordinary SBS or SEBS type polymers. This is due to the higher vinyl content. For instance, in mapping adhesives and/or other applications requiring high blending temperatures (greater than 200° C.) preferably fully hydrogenated SEBS type polymers are used. They are used despite their higher costs, as SBS type polymers and high vinyl polymers are more vulnerable to cross-linking at the elevated temperatures.

It would therefore be of great interest to find a styrenic block copolymer that combines the high temperature viscosity and aging characteristics of an IPD polymer with the reduced tendency to gelation normally associated with SEBS type polymers.

In addition, it would be of great interest to find a styrenic block copolymer with increased compatibility with various bitumens. Thus, bituminous compositions comprising more than 3% by weight of an ordinary stryenic block copolymer and e.g. a Venuzuelan bitumen may suffer from insufficient storage ability due to phase separation. When phase separation occurs, then the composition is less processable due to substantial viscosity increase in the polymer rich phase.

BRIEF DESCRIPTION OF THE INVENTION

Accordingly, the present invention provides a bituminous composition which comprises a bituminous component (I), a block copolymer (II), comprising at least two terminal blocks of a poly(monovinylaromatic hydrocarbon) and at least one block of a poly(conjugated diene), and optionally a filler (III), wherein (II) is a partially, selectively hydrogenated block polymer, comprising butadiene as the conjugated diene, wherein the poly(conjugated diene) block has an initial content of 1,2-diene recurring units (A) in the range of 5–95 mol %, preferably 6–70 mol %, more preferably 8–50 mol %, and upon partial hydrogenation comprises less than 3 mol % 1,2-diene recurring units (A) and less than 20 mol % preferably less than 3 mol % ethylene recurring units (D), calculated on the total content mol/mol of conjugated diene recurring units.

DETAILED DESCRIPTION OF THE INVENTION

The components of the bituminous composition will be described hereafter.

Bitumen

The bituminous component present in the bituminous compositions according to the present invention may be a naturally occurring bitumen or derived from a mineral oil. Also petroleum pitches obtained by a cracking process and coal tar can be used as the bituminous component as well as blends of various bituminous materials. Examples of suitable components include distillation or "straight-run bitumens", precipitation bitumens, e.g. propane bitumens, blown bitumens, e.g. catalytically blown bitumen or multigrade, and mixtures thereof. Other suitable bituminous components include mixtures of one or more of these bitumens with extenders (fluxes) such as petroleum extracts, e.g. aromatic extracts, distillates or residues, or with oils. Suitable bituminous components (either "straight-run bitumens" or "fluxed bitumens") are those having a penetration of in the range of from 50 to 250 dmm at 25° C. Generally a straight run or distilled bitumen having a penetration in the range of from 150 to 250 dmm will be the most convenient to use. Both compatible as well as incompatible bitumens may be used.

Elastomer

The bituminous composition according to the invention contains at least one block copolymer comprising at least two terminal blocks of a poly(monovinylaromatic hydrocarbon) and at least one block of partially, selectively hydrogenated poly(conjugated diene) as elastomer component. Said conjugated diene is predominantly (at least 80 mol %, preferably at least 90 mol %) butadiene, but said block may comprise recurring units derived from conjugated dienes with from 5 to 8 carbon atoms per monomer, for example 2-methyl-1,3-butadiene (isoprene), 2,3-dimethyl-1,3-butadiene, 1,3-pentadiene and 1,2-hexadiene. Suitable monovinylaromatic hydrocarbons are o-methyl styrene, p-methyl styrene, p-tert-butylstyrene, 2,4-dimethylstyrene, α-methylstyrene, vinyl naphthalene, vinyl toluene, vinyl xylene, and the like or mixtures thereof, and in particular styrene.

These block copolymers may be linear or branched, and symmetric or asymmetric. A -preferred- example of a suitable block copolymer is the triblock copolymer of the configuration A-B-A, in which "A" represents a poly (monovinylaromatic hydrocarbon) block, and "B" represents a poly(conjugated diene) block. These block copolymers may be further defined by the content of monovinyl aromatic hydrocarbons in the final block copolymer, their molecular weight and their microstructure, as discussed hereinafter.

The content of monovinyl aromatic hydrocarbons of the final block copolymer suitably ranges from 10 to 70, more preferably from 20 to 50% w (based on the total block copolymer).

The polymer blocks of monovinyl aromatic hydrocarbons ("A") advantageously have an apparent molecular weight in the range from 2,000 to 100,000, in particular from 5,000 to 50,000. The polymer blocks of conjugated dienes ("B") preferably have an apparent molecular weight in the range of from 25,000 to 1,000,000, particularly from 30,000 to 150,000.

With the term "apparent molecular weight" as used throughout the specification is meant the molecular weight of the polymer (block), as measured with gel chromatography (GPC) using polystyrene calibration standards (according to ASTM 3536).

Through modification of the polymerization, it is possible to direct the conjugated dienes to propagate in a manner wherein the carbon atoms of a single unsaturated bond are incorporated in the backbone, resulting in 1,2-diene recurring units, or in a manner wherein all carbon atoms of the unsaturated conjugated bonds are incorporated in the backbone, resulting in 1,4-diene recurring units. With respect to the former manner, poly(conjugated dienes) are defined by their vinyl content, referring to the unsaturated bond that is now attached to the polymer backbone.

Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxypropane, 1-ethoxy-2,2-tert-butoxyethane, of which 1,2-diethoxypropane is most preferred.

Suitably, the total vinyl content of the block copolymer is at least 5% by weight (based on the blocks of poly(conjugated diene)), preferably in the range of from 5 to 95, more preferably in the range of from 8 to 50% by weight.

The preparation of block copolymers is known in the art. In GB 1,538,266 a number of methods are described. For example, block copolymers may be prepared by coupling at least two diblock copolymer molecules together, using suitable coupling agents such as adipates (e.g., diethyl adipate) or silicon-compounds (e.g., silicon tetra-chloride, dimethyldichlorosilane, methyldichlorosilane or gamma-glycidoxypropyl-trimethoxysilane) or a nucleus prepared by oligomerization of di- or tri-vinyl benzene. Other coupling agents can be selected from polyepoxides, such as epoxidized linseed oil, or epoxidized bisphenols (e.g. the diglycidylether of bisphenol A), polyisocyanates (e.g., benzo-1,2,4-triisocyanate), polyketones (e.g., hexane-1,3,6-trione), polyanhydrides or polyhalides (e.g., dibromoethane) and the like.

Using coupling agents, a residue of uncoupled diblock copolymer will remain in the final product. This residue is referred to as the "diblock content". Where the block copolymer is prepared via a technique where no diblock is specifically prepared or isolated, such as in full sequential preparation, it is known that the final amount of diblock copolymer can be adjusted. The diblock content may for instance be in the range of from 10 to 25% w and more preferably from 15 to 25% w, based on the elastomer component.

The hydrogenation of the block copolymer may be carried out in a manner similar to the hydrogenation processes described in U.S. Pat. No. 3,700,748, U.S. Pat. No. 3,663,635, DE 3401983, U.S. Pat. No. 5,039,755, U.S. Pat. No. 0,513,272, EP 339986, EP 434469, EP 544304, EP 795564, EP 810231, and WO 9525130. Partial, selective hydrogenation processes, which are particularly suitable are described in a paper, entitled "Metallocenes: homogeneous catalysts for elastomer hydrogenation", by the authors M. D. Parellada, J. A. Barrio, J. A. Delgado (Rev. R. Aced. Cienc. Exactas, Fis. Nat. Madrid (1993), 87(1), 127–9), and in patent documents EP 545844; EP 584860; JP 04096904; EP 302505; JP 08106490; and U.S. Pat. No. 5,925,717. Particularly suitable is the method described in co-pending European patent application No. 0306435.9, filed 28Jul. 2000, which describes a method a process for preparing a partially, selectively hydrogenated butadiene polymer comprising no more than 3 mol % 1,2-butadiene recurring units (A) and no more than 3 mol % ethylene recurring units (D), calculated on the total content mol/mol of recurring units, wherein a butadiene polymer comprising 1,2-butadiene recurring units (A) and 1,4-butadiene recurring units (B) is hydrogenated in the presence of hydrogen and a titanium-, zirconium- and/or hafnium-based metallocene compound as hydrogenation catalyst and a cocatalyst, characterized in that:

a) the hydrogenation catalyst has a reaction rate ratio of r1/r2 greater than 5, wherein r1 and r2 are the hydrogenation rates of recurring units (A) and (B) respectively at the same reaction conditions,
b) the cocatalyst is an alkali metal hydride, added as such or prepared in situ, and
c) hydrogenation of the conjugated diene is carried out until at least 97% of recurring units (A) have been hydrogenated.

The patent documents on hydrogenation processes are all included herein by reference.

Elastomer component (B) is suitably present in the bituminous composition in an amount in the range of from 1 to 20% by weight, based on the total composition, more preferably from 6 to 15% by weight.

Additional Components

The bituminous composition may also, optionally, contain other ingredients such as may be required for the end-use envisaged. Thus fillers may be included, for example talc, calcium carbonate and carbon black, or other components including resins, oils, stabilisers or flame retardants may be incorporated. The content of such fillers and other components may be in the range of from 0 to as much as 40% by weight. Of course, if advantageous, other polymer modifiers may also be included in the bituminous composition of the invention.

For instance, it is also possible to add one of more further elastomers to the bituminous composition, e.g., selected from polyesters, polyacrylates, polysulfides, polysilicones and polyesteramides, that show elastomeric behaviour.

End-uses

The useful low temperature and high temperature properties of the polymer-bitumen blends of the present invention coupled with the improved ageing resistance enables such blends to be of significant benefit in uses where the blends are exposed to external weather conditions, such as use in roofing applications, for example as a component of roofing felt. The usefully low high-temperature viscosity not just means that the polymer-bitumen blends can be more easily processed but also means that they enable a greater amount of filler to be incorporated before the maximum allowable processing viscosity is achieved, and thus leads to a cheaper product in those applications where fillers are commonly used.

Other applications in which the polymers themselves and/or the bituminous compositions of the present invention may be of use are in roads, sound deadening, in adhesive, sealant or coating compositions and/or in vibration dampening compositions.

The following Examples illustrate the present invention.

Elastomers

Polymer A used as comparative is a branched SBS type polymer having a styrene content of about 30% w, an apparent molecular weight of about 400,000; a vinyl content of about 44% w, and a coupling efficiency (using gamma glycidoxy-propyltrimethoxysilane) of about 92%. Table 1 lists the vinyl content and the cis/trans content, of the 1,4-diene recurring units.

Polymers 1–3 are hydrogenated versions of polymer A. Polymer 1 is partially, selectively hydrogenated, whereby all vinyl groups are removed with the use of a titanium-based hydrogenation catalyst. Polymers 2 and 3 are provided for comparison and illustrate hydrogenated polymers wherein the diene recurring units (non-selectively) are hydrogenated to 30 mol % (using a nickel-based hydrogenation catalyst) or to 70 mol % (using a cobalt-based hydrogenation catalyst). Their properties are also included in Table 1.

Polymer B, used as comparative, is a branched SBS type polymer having a styrene content of about 30% w, an apparent molecular weight of about 380,000; a vinyl content of about 8% w, and a coupling efficiency (GPTS) of about 90%. Polymer 4 is the partially, selectively hydrogenated version thereof, whereas polymer C is the corresponding high vinyl version of polymer B. The vinyl content and the cis/trans content of these polymers are listed in Table 2.

TABLE 1

| Polymer | A | 1 | 2 | 3 |
|---|---|---|---|---|
| Vinyl [%] | 44 | 0 | 26 | 6 |
| Cis/Trans [%] | 56 | 56 | 43 | 24 |

TABLE 2

| Polymer | B | 4 | C |
|---|---|---|---|
| Vinyl [%] | 8 | 0 | 61 |
| Cis/Trans [%] | 92 | 92 | 39 |

Bituminous Compositions

Master batches with 12% wt of the aforementioned polymers were made in a commercially available B-180 bitumen, using a Silverson L4R high shear mixer. The bitumen was heated to 160° C. and subsequently the polymer was added. Upon blending, the temperature increased to 180° C., which is caused by the energy input from the mixer. Blending at this temperature was continued until a homogeneous blend was obtained which was monitored by fluorescence microscopy.

Test Methods

A standard evaluation on the compositions without filler, i.e. the determination of the penetration at 25° C., softening point, DIN flow resistance and cold bend, was carried out.

Gelation tests (cross-linking) were done in a modified Haake Rotoviscometer. Thus, 50 grams of the ready-made composition is stirred with an anchor shaped stirrer at a rotation speed of 300 rpm at 200° C. while a constant flow of air of 20 Nl/hr is blown on the surface of the sample. The stirrer is directly attached to the measuring device of the Haake viscometer, such that an increase in the sample's viscosity, indicative of the onset of gelation, is recorded as an increase in the Haake's torque signal. This torque signal is a measure for the sample's viscosity and is monitored until a sudden steep torque increase indicates that the relative viscosity increases sharply. The number of hours after which this steep viscosity increase occurs is a measure for the composition's gelation tendency.

Experiments A, 1–3

Typical performance properties of 12% in B-180 bitumen compositions are given in Table 3.

TABLE 3

| Polymer | Exp. A<br>A | Exp. 1<br>1 | Exp. 2<br>2 | Exp. 3<br>3 |
|---|---|---|---|---|
| Pen at 25° C., dmm | 45 | 47 | 43 | 42 |
| R & B, ° C. | 129 | 131 | 133 | 142 |
| Flow, pass ° C. | 115 | 115 | 110 | 110 |
| Cold bend, pass ° C. | −25 | −30 | −25 | −15 |

Results

Composition 1 shows the performance properties of the compound with the selective (vinyl only) hydrogenated SBS. The cold bend of the composition containing polymer 1 is better than that of the other compositions. This is believed to be due to a lowering of the $T_g$ of the selective hydrogenated SBS in comparison with the $T_g$ of the other SBS polymers. In addition, this composition exhibits an attractive combination of R&B softening point and Flow resistance.

Compositions 2 and 3 show the initial performance properties of the compounds with the partial (random) hydrogenated SBS polymers. With (partial, random) hydrogenation of a SBS to a SEBS, the $T_g$ of the polymer will increase, which is reflected by the poorer cold bend of composition 3. Furthermore, the softening point R&B, which reflects the strength of the network at elevated temperatures at short loading times, will increase, while the flow resistance, which reflects the high temperature resistance at longer loading times, will be poorer due to a poorer compatibility of SEBS polymer in bitumen, i.e. at longer loading times the asphaltenes present in the bitumen will flow through the polymer network at elevated temperatures, which is also reflected by composition 3.

The results of composition 2, the compound with the SBS with a lower partial hydrogenation level, shows results in between those of composition A and composition 3.

In addition, it can be concluded that polymer 1 shows similar performance properties in bitumen in comparison with those of its unhydrogenated precursor, however, with improved cold bend properties.

Gelation Experiments B, 4, C (Gelation)

In addition to polymers A, 1–3, three additional polymers with varying vinyl contents were screened on their gelation tendency in B-180 bitumen (cf. Table 2).

The results of the screening are summarized in Table 4.

TABLE 4

| | Time to gelation of 12% polymer in B-180 bitumen | | | | | | |
| --- | --- | --- | --- | --- | --- | --- | --- |
| polymer | A | 1 | 2 | 3 | B | 4 | C |
| Time to gel [hr] | 15 | >170*) | 36 | >170*) | 50 | 88 | 10 |

*)experiment cancelled—still no gelation observed

Polymer C confirms that a higher vinyl content results in a poorer resistance to gelation (see polymer 1), while polymer 4 confirms that a selective hydrogenation improves the resistance to gelation (see polymer 1).

The results found in Table 4 also illustrate an improved resistance to gelation for polymers 1 and 3, however, the performance properties of the compound with the selective hydrogenated polymer 1 are significantly better in comparison with those of the compound with the partial hydrogenated polymer 3.

The invention claimed is:

1. A bituminous composition comprising:
   (I) a bituminous component, and
   (II) a block copolymer comprising at least two terminal blocks of a poly(monovinylaromatic hydrocarbon) and at least one block of a poly(conjugated diene),
   wherein (II) is a partially, selectively hydrogenated block polymer comprising butadiene as the conjugated diene, selectively hydrogenated by a process in which the ratio of hydrogenation of the 1,2 butadiene recurring units to the 1,4 butadiene recurring units is greater than 5 wherein the poly(conjugated diene) block has an initial content of 1,2-diene recurring units (A) in the range of 5–95 mol %, and, upon partial hydrogenation, the partially hydrogenated block polymer comprises less-tan 3 mol percent 1,2-diene recurring units (A) and less than 20 mol percent ethylene recurring units (D), calculated on the total content mol/mol of initial conjugated diene recurring nails.

2. The composition of claim 1 additionally comprising (III) a filler.

3. The composition of claim 1 wherein the poly(monovinylaromatic hydrocarbon) is polystyrene.

4. The composition of claim 1 wherein the component I is a straight run or distilled bitumen.

5. The composition of claim 4 wherein the straight rum or distilled bitumen has a penetration in the range of 50 to 250 dmm at 25° C.

6. The composition of claim 5 wherein the straight run or distilled bitumen has a penetration in the range of 150 to 250 dmm at 25° C.

7. The composition of claim 1 wherein the poly(conjugated diene) block, upon partial hydrogenation, comprises less-than 3 mol percent 1,2-diene recurring units (A) and less than 3 mol percent ethylene recurring units (D), calculated on the total content mol/mol of conjugated diene recurring units.

8. The composition of claim 7, wherein the poly(conjugated diene) block has an initial content of 1,2-diene recurring units (A) in the range of 6–70 mol percent, calculated on the total content mol/mol of conjugated diene recurring units.

9. The composition of claim 1, wherein the poly(conjugated diane) block is at least 80 mole percent butadiene.

10. The composition of claim 9 wherein the poly(conjugated diane) block is additionally comprising conjugated dienes of from 5 to 8 carbon atoms per monomer.

11. The composition of claim 10 wherein the conjugated dienes of from 5 to 8 carbon atoms per monomer are selected from the group consisting of 2-methyl-1,3-butadiene; 2,3-dimethyl-1,3butadiene; 1,3-pentadiene; 1,2-hexadiene; and mixtures thereof.

12. The composition of claim 1 wherein the poly(monovinylaromatic hydrocarbon) blocks are polymerized monomers selected from the group consisting of styrene, o-methyl styrene, p-methyl styrene, p-tert-butylstyrene, 2,4-dimethylstyrene, a-methylstyrene, vinyl naphthalene, vinyl toluene, vinyl xylene, and mixtures thereof.

13. The composition of claim 1 wherein the content of monovinylaromatic hydrocarbons of the final block copolymer ranges from 10 to 70% wt.

14. The composition of claim 1 wherein the polymer blocks of monovinylaromatic hydrocarbons ("A") have an apparent molecular weight in the range from 2,000 to 100,000.

15. The composition of claim 1 wherein the polymer blocks of conjugated dienes ("B") have an apparent molecular weight in the range of from 25,000 to 1,000,000.

16. The composition of claim 1 wherein the amount of component (II) is in the range of 1–20 percent by weight on the basis of the composition.

17. A process for preparing or repairing a roof comprising using a composition of claim 1 in a roofing application.

18. The process of claim 17 wherein the composition of claim 10 is a component of a roofing felt.

19. A bituminous composition comprising:
   (I) a bituminous component, and
   (II) a block copolymer comprising at least two terminal blocks of a poly(monovinylaromatic hydrocarbon) and at least one block of a poly(conjugated diene),
   wherein (II) is a partially, selectively hydrogenated block polymer comprising butadiene as the conjugated diane, selectively hydrogenated by a process in which the ratio of hydrogenation of the 1,2 butadiene recurring units to the 1,4 butadiene recurring units is greater than 5 wherein the poly(conjugated diene) block has an initial content of 1,2-diene recurring units (A) in the range of 4–50 mol %, and, upon partial hydrogenation, to partially hydrogenated block polymer comprises less-than 3 mol percent 1,2-diane recurring units (A) and less than 3 mol percent ethylene recurring units (D), calculated on the total content mol/mol of initial conjugated diene recurring units.

* * * * *

UNITED STATES PATENT AND TRADEMARK OFFICE
CERTIFICATE OF CORRECTION

PATENT NO. : 7,148,273 B2 Page 1 of 1
APPLICATION NO. : 10/433218
DATED : December 12, 2006
INVENTOR(S) : Wouter de Jong et al.

It is certified that error appears in the above-identified patent and that said Letters Patent is hereby corrected as shown below:

Claim 1, line 15, col. 7, line 36 delete "less-tan" and insert --less-than--.
Claim 1, line 18, col. 7, line 38 delete "nails" and insert --units--.
Claim 5, line 1, col. 7, line 44 delete "rum" and insert --run--.
Claim 9, line 2, col. 8, line 5 delete "mole" and insert --mol--.
Claim 19, line 7, col. 8, line 46 delete "diane" and insert --diene--.
Claim 19, line 13 col. 8, line 53 delete "to" and insert --the--.
Claim 19, line 14, col. 8, line 54 delete "diane" and insert --diene--.

Signed and Sealed this

Twenty-seventh Day of November, 2007

JON W. DUDAS
*Director of the United States Patent and Trademark Office*